US012583743B2

(12) United States Patent
Vispute et al.

(10) Patent No.: US 12,583,743 B2
(45) Date of Patent: Mar. 24, 2026

(54) METHOD FOR CARBON FORMATION FREE OPERATION OF REFORMERS

(71) Applicants: Tushar P. Vispute, Spring, TX (US); Monica Zanfir, Williamsville, NY (US)

(72) Inventors: Tushar P. Vispute, Spring, TX (US); Monica Zanfir, Williamsville, NY (US)

(73) Assignee: PRAXAIR TECHNOLOGY, INC., Danbury, CT (US)

( * ) Notice: Subject to any disclaimer, the term of this patent is extended or adjusted under 35 U.S.C. 154(b) by 853 days.

(21) Appl. No.: 17/951,190

(22) Filed: Sep. 23, 2022

(65) Prior Publication Data

US 2024/0101418 A1 Mar. 28, 2024

(51) Int. Cl.
| | |
|---|---|
| *C01B 3/38* | (2006.01) |
| *B01J 8/06* | (2006.01) |
| *C01B 3/386* | (2026.01) |

(52) U.S. Cl.
CPC .............. *C01B 3/386* (2013.01); *B01J 8/062* (2013.01); *C01B 2203/0233* (2013.01); *C01B 2203/1241* (2013.01); *C01B 2203/1619* (2013.01); *C01B 2203/1623* (2013.01); *C01B 2203/168* (2013.01)

(58) Field of Classification Search
CPC ........... C01B 3/386; C01B 2203/0233; C01B 2203/1241; C01B 2203/1619; C01B 2203/1623; C01B 2203/168
See application file for complete search history.

(56) References Cited

U.S. PATENT DOCUMENTS

| | | | |
|---|---|---|---|
| 3,120,431 A | | 2/1964 | Carton et al. |
| 4,740,357 A | * | 4/1988 | Buswell .................... C01B 3/38 |
| | | | 422/658 |
| 8,219,247 B2 | | 7/2012 | Esmaili et al. |
| 8,303,929 B2 | * | 11/2012 | Peng ....................... C01B 3/384 |
| | | | 252/373 |
| 9,897,493 B2 | | 2/2018 | Zhao et al. |
| 2010/0160705 A1 | * | 6/2010 | Kosters ................ B01J 19/2415 |
| | | | 422/600 |
| 2011/0113993 A1 | * | 5/2011 | Esmaili .................. B01J 12/007 |
| | | | 110/190 |

FOREIGN PATENT DOCUMENTS

| | | | | |
|---|---|---|---|---|
| EP | 2708812 A1 | | 3/2014 | |
| EP | 2708812 B1 | * | 8/2017 | ............. C01B 3/384 |
| FR | 3090825 A3 | | 6/2020 | |
| WO | WO-2013002752 A1 | * | 1/2013 | ............... C01B 3/40 |

OTHER PUBLICATIONS

Mohsen Behnam and Anthony G. Dixon; "3D CFD Simulations of Local Carbon Formation in Steam Methane Reforming Catalyst Particles"; International Journal of Chemical Reactor Engineering, 2017, 20170067; pp. 1-17.

(Continued)

*Primary Examiner* — Matthew J Merkling

(74) *Attorney, Agent, or Firm* — Iurie A. Schwartz

(57) ABSTRACT

A method of operating a reformer furnace is disclosed. The method comprises using a carbon margin in balancing the furnace temperature thereby leading to carbon free formation operation and improved efficiency.

20 Claims, 4 Drawing Sheets

(56)             References Cited

OTHER PUBLICATIONS

J.-W. Snoeck and G.F. Froment; "Steam/CO2 Reforming of Methane. Carbon Formation and Gasification on Catalysts with Various Potassium Contents"; Ind. Eng. Chem. Res. 2002, 41, 3548-3556.
Dean Latham; "Mathematical Modelling of an Industrial Steam Methane Reformer"; Queen's University, Kingston, Ontario, Canada (Dec. 2008); pp. i-256.
Marisa N. Pedernera, Juliana Pina, Daniel O. Borio, and Veronica Bucala; "Use of a heterogeneous two-dimensional model to improve the primary steam reformer performance"; Chemical Engineering Journal 94 (2003) pp. 29-40.

* cited by examiner

Temperature Profiles

Temperature (F)

Distance from Roof (ft)

Red: Outer row tubes, Blue Inner row Tubes

——— Unbalanced
— — — Balanced with no carbon margin considerations
· · · · · · Balanced with carbon margin considerations

METHOD FOR CARBON FORMATION FREE OPERATION OF REFORMERS

FIELD OF THE INVENTION

The disclosure relates to a method of operating a reforming furnace using a tube wall temperature balancing strategy that results in carbon formation free operation and higher efficiency.

BACKGROUND OF THE INVENTION

In steam methane reforming (SMR) processes, the process gas, principally steam and methane, passes through catalyst-filled reformer tubes wherein it is converted to hydrogen as the main product. The reformer tubes are enclosed in a furnace containing hot flue gas radiating heat to the tubes, which enables the endothermic reforming reactions. Reformer tubes are expensive and have limited life (typically designed for 100,000 hours of operation with at the design temperature of 1750° F.) which is greatly affected by their operating temperature. It is also beneficial to run all the tubes as close to design temperature as possible to maximize energy efficiency of hydrogen production. Typically, the highest temperatures along the length of a reformer tube are observed near the bottom portion of the tube for a top-fired reformer. In a top-fired reformer, the burners are installed on the top of the radiant chamber of the furnace, where the inlet gas mixture section is located. Heat flux and gas mixture are thus in a co-current configuration. Maximum heat is provided in the first part of the reactor where the gas is fresh, and the reaction kinetics are faster.

The temperature spread among the reformer tubes can be reduced by furnace balancing. Here, hot tubes and/or sections of the reformer are identified by temperature measurements whereafter the fuel flow is redistributed from relatively hotter areas of the furnace to relatively cooler areas by adjusting burner valve positions. Temperature spread is typically defined as a function of standard deviation of the measured temperature, or simply as the difference between maximum and minimum tube wall temperatures. Since the highest temperatures along the length of a reformer tube are observed near the bottom portion of the tube, temperatures at these elevations (in the bottom half of the furnace) are used for balancing the furnace.

It is also important that in a top-fired reformer, all tube temperatures, at all elevations, are maintained below the temperature above which the rate of carbon formation reactions on the catalyst is greater than the rate of carbon removal via gasification reactions. Operating above this temperature can result in catalyst deactivation and hotspots on reformer tubes. The difference between the current maximum process gas temperature, which is equal to the inside wall temperature of the reformer tube, and the temperature at which rate of carbon formation is positive is called the carbon margin.

Typically, as known in the art, reforming balancing in a top-fired furnace is done based on the tube wall temperature (TWT) measurements in the bottom half of the furnace. This is because the TWTs are highest towards the furnace bottom in a top-fired reformer. Balancing, as known, is done to alleviate these hottest TWTs in the furnace by shifting heat towards the cooler areas of the furnace. This also enables pushing the furnace to higher reformer outlet temperature (ROT), which improves energy efficiency of the process.

Also typically, as known in the art, top-fired reformers have smaller burners in the outer burner rows compared with the burners located in the inner rows. The tubes located in the outer row (near the furnace wall) have TWTs that are lower than the TWTs of interior tube rows in the bottom half of the reformer. Various objective functions, e.g., minimizing the hottest observed TWT (Eq. 1a), or minimizing the TWT spread (Eq. 1b) are known and can be used to determine magnitudes of fuel valve adjustments required to modulate the burner operation and thus achieve the targeted TWT profile by minimizing the hottest observed TWT or by minimizing the TWT spread among all tubes in the furnace.

$$\text{minimize}[\max(\text{TWTlower}_{i_{initial}} + \Sigma_{j=1}{}^{m} \quad \text{gain}_{ij} \times \Delta \text{valve}_{j})_{i=1}{}^{n}] \qquad \text{Eq. 1a}$$

$$\text{minimize}[\text{stdev}(\text{TWTlower}_{i_{initial}} + \Sigma_{j=1}{}^{m} \quad \text{gain}_{ij} \times \Delta \text{valve}_{j})_{i=1}{}^{n}] \qquad \text{Eq. 1b}$$

Wherein $\text{TWTlower}_i$ is the lower half tube wall temperature of the $i^{th}$ tube in the reformer, $\text{gain}^{ij}$ is the change in lower half tube wall temperature of the $i^{th}$ tube per unit change in the fuel valve positions of the $j^{th}$ burner group, and $\Delta \text{valve}_j$ is the amount of adjustment made in the fuel valve positions of the $j^{th}$ burner group. Given this typical TWT pattern, balancing without any constraints, other than tube design temperature limitation as known in the art, typically results in more heat being pushed from inside burner rows to outside burner rows.

Heat redistribution upon balancing using lower half TWTs also results in changing the TWTs of the upper half. For example, sending more heat towards the relatively cooler outer rows results in an increase in the TWTs at upper half of the outer rows. The probability of carbon formation is highest in the upper half of the reformer tubes due to conducive process conditions of relatively high methane/hydrocarbon concentration with high temperatures. In a reformer, carbon is typically deposited on the catalyst by cracking of hydrocarbons and CO, and it is simultaneously removed by gasification by steam and hydrogen. The propensity of carbon formation can be determined by using a carbon formation model. Such models use process conditions (T, P, species concentrations) to calculate the rate of carbon formation, rate of carbon gasification or directly a net rate of carbon formation. If the net rate of carbon formation is positive, then carbon will accumulate on the reforming catalyst resulting in catalyst deactivation and eventually tube hotspots. The carbon formation typically starts on or near the inside wall of the tube which is the hottest temperature experienced by process gas. Carbon formation models for typical Ni-based reforming catalysts that are known in the art available in literature, [see e.g., J.-W. Snoeck and G. F. Froment, Steam/CO2 Reforming of Methane. Carbon Formation and Gasification on Catalysts with Various Potassium Contents, *Ind. Eng. Chem. Res.* 2002, 41, 3548-3556] can be used. Parameters for such models can be derived for the catalyst of interest by collecting relevant experimental data.

There is hence a need desirable for a method of reformer furnace operation that controls the reformer tube wall temperatures, at various elevations, below the design temperature as well as below the carbon formation temperature for a safe and reliable operation.

SUMMARY OF THE INVENTION

In one aspect, the disclosure is directed to a method of operating a top-fired steam reformer furnace. Generally, the furnace comprises (i) an upper half and a bottom half, (ii) a plurality of burners, (iii) a plurality of reformer tubes disposed vertically within the furnace, each reformer tube having a section located in the upper half of the furnace and a section located in the bottom half of the furnace, (iv) a plurality of burners, each burner having a burner valve with an adjustable position for controlling the fuel flow and associated heat release to the furnace in the vicinity of that burner, the method comprising: (a) obtaining, for at least a portion of the reformer tubes, the outside tube wall temperature at one or more elevations in the bottom half of the furnace, and, for that same portion of reformer tubes, obtaining the outside tube wall temperature at one or more elevations in the upper half of the furnace; (b) calculating, using (i) a Reformer Model or (ii) a combination of a Reformer Model and the outside tube wall temperatures obtained in step (a), the inside wall temperature at the one or more elevations in the bottom half of the furnace, and at the one or more elevations in the upper half of the furnace, for one or more reformer tubes located in the same portion of reformer tubes as in step (a); (c) calculating, using (i) a Reformer Model or (ii) a Reforming Catalyst Carbon Formation Model, the temperature for carbon formation under then-existing process conditions at the one or more elevations in the bottom half of the furnace, and at the one or more elevations in the upper half of the furnace, for the same one or more reformer tubes in step (b); (d) calculating Carbon Margin at the one or more elevations in the bottom half of the furnace, and at the one or more elevations in the upper half of the furnace, by subtracting the inside wall temperature calculated for the one or more reformer tubes in step (b), from the carbon formation temperature calculated for the one or more reformer tubes in step (c); (e) calculating the maximum allowable operating temperature for the reformer tube section located in the upper half of the furnace by adding the Carbon Margin calculated in step (d) for the one or more elevations in the upper half of the furnace to the outside tube wall temperature at the one or more elevations in the upper half of the furnace obtained in step (a); (f) determining, from the maximum allowable operating temperature calculated in step (e), a temperature balance for the furnace; and (g) adjusting the burner valve positions to implement the temperature balance of the furnace.

Employing a carbon margin constraint as herein disclosed in determining the temperature balance ensures continued safe operation of the reformer furnace without catalyst deactivation due to carbon formation and without subsequent hot band formation on reformer tubes.

Additionally, the instant method allows the carbon formation free operation of the reformer furnace at the most optimum operating conditions (rate; Reformer Outlet Temperature, ROT; and Steam-to-Carbon ratio, S/C) for the prevailing catalyst conditions (carbon margin). It also permits the reformer furnace to be balanced based on tube wall temperatures measured in the lower half of the reformer furnace while at the same time reducing, even preventing carbon formation in the top half of the reformer tubes. Moreover, a reformer furnace balanced pursuant to the present method can be operated at higher ROT than an unbalanced reformer, resulting in efficiency improvements. The method of furnace operation disclosed comprising the instant balancing strategy is especially useful for aged catalyst where active carbon margin management is necessary in order to maximize hydrogen production and/or energy efficiency of hydrogen production while ensuring that no carbon forms on the catalyst resulting in hotspots.

DETAILED DESCRIPTION

Figure 1:
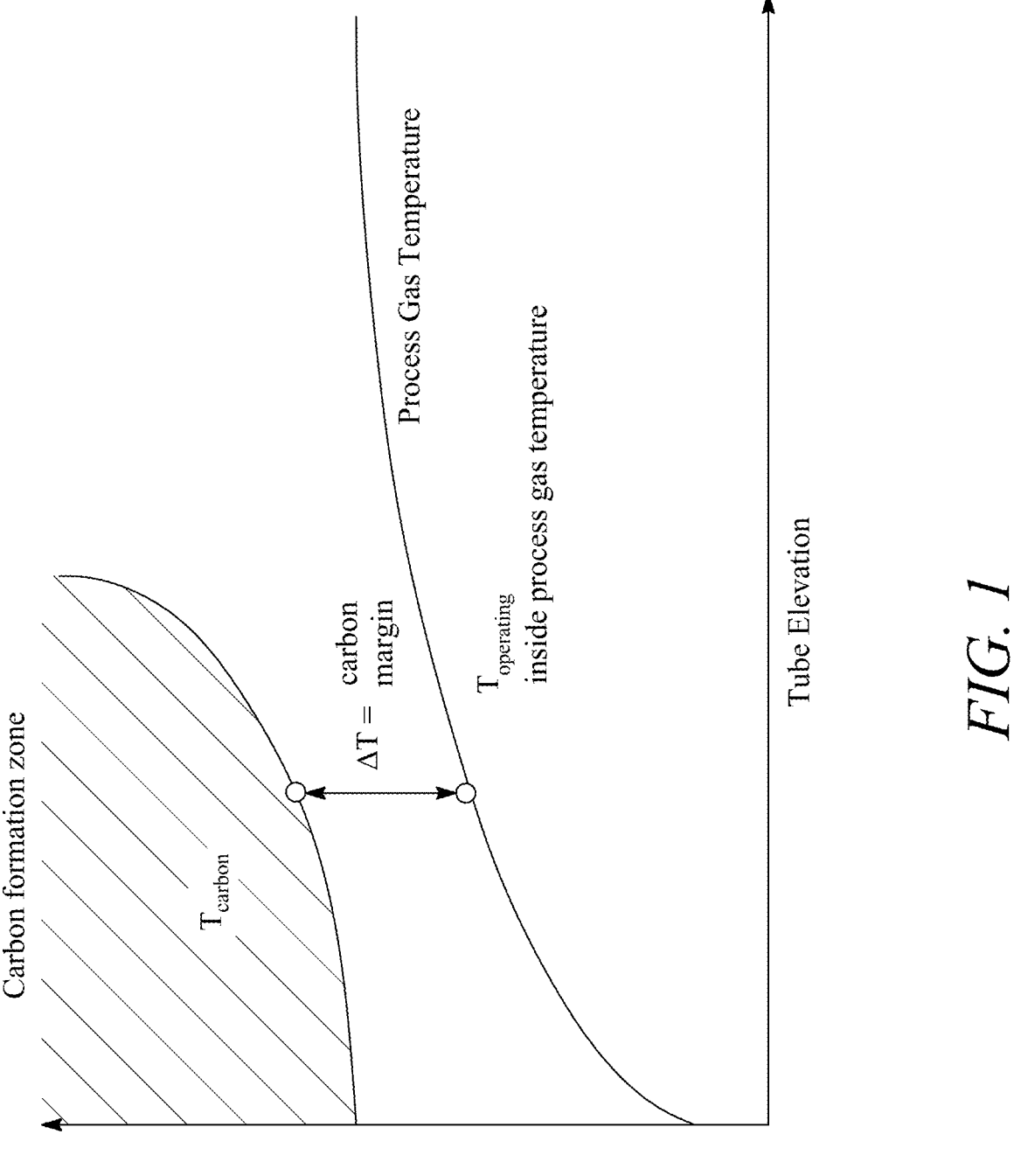
FIG. 1 is a graph of a representative reformer carbon margin as a function of reformer tube elevation.

The following detailed description of embodiments of the disclosure are made in part with reference to the accompanying figures. Explanation about related functions or constructions known in the art are omitted for the sake of clearness in understanding the concept of the invention to avoid obscuring the invention with unnecessary detail.

In one practice, the instant disclosure is directed to a method of operating a top-fired reformer furnace which utilizes an improved reformer tube wall temperature balancing strategy employing carbon margin value-based constraints in the upper half of the reformer to ensure continued carbon formation free operation of reformer at high efficiency. In one embodiment of the method, a top-fired steam reformer furnace, including those furnace designs known in the art, generally comprises (i) an upper half and a bottom half, (ii) a plurality of burners, (iii) a plurality of reformer tubes disposed vertically within the furnace, each reformer tube having a section located in the upper half of the furnace and a section located in the bottom half of the furnace, (iv) a plurality of burners, each burner having a burner valve with an adjustable position for controlling the fuel flow and associated heat release to the furnace in the vicinity of that burner. The plurality of reformer tubes can include catalyst-filled tubes as known in the art, e.g., nickel-based catalysts, and can include pigtails, as known in the art, which account for thermal expansion between the reformer tubes and related manifolds, e.g., pigtails can comprise tubes of various geometry to carry reformed gas product to collection manifolds. Upper and bottom halves of the furnace are generally defined by the vertical midpoint of the radiation chamber within which the reformer tubes are vertically disposed in a substantially parallel configuration.

In one aspect, the method disclosed comprises (a) obtaining, for at least a portion of the reformer tubes, the outside tube wall temperature at one or more elevations in the bottom half of the furnace, and, for that same portion of reformer tubes, obtaining the outside tube wall temperature at one or more elevations in the upper half of the furnace. In various practices, the portion of reformer tubes in this regard comprises at least 15% of the reformer tubes; in other practices, the portion of reformer tubes comprises at least 25%, at least 50%, at least 75%, and 100%. The portion of reformer tubes in this regard can further be comprised of adjacent reformer tubes, non-adjacent reformer tubes, including reformer tubes that are spatially distributed throughout the furnace, e.g., in a random spatially distributed pattern or a pre-determined spatially distributed pattern or series of patterns. Tube wall temperatures can be determined by means known in the art, for example, by pyrometer, infrared camera, and the like, including combinations of same.

Alternatively, the outside tube wall temperatures for the portion of reformer tube sections located in the upper half of the furnace can be estimated from the tube wall temperatures directly measured from the same portion of reformer tube sections located in the bottom half of the furnace, or vice versa, using empirical correlations obtained from the past measurement data; or they can also be estimated from a Reformer Model as known in the art such as physics-based reformer models and Computational Fluid Dynamics (CFD) based Reformer Models). Reformer Models include, for example, physics-based Reformer Models such as Latham (Latham D., 2009, Mathematical Modelling of an Industrial Steam Methane Reformer, PhD Thesis, Queen's University, Kingston, Canada) and Pedernera et al. (Pedernera M. N. et al., Use of heterogeneous two-dimensional model to improve the primary steam reformer performance, Chem. Eng. J., 2003, 94, pp. 29-40). Typically, in these Reformer Models, reformer feed and fuel input information, burner heat release profile is provided and outer-tube wall, inner-tube wall, furnace gas and process gas temperatures are calculated as output. An example of CFD-based reformer model can be seen in Dixon, 2017 (Dixon A. G., Local transport and reaction rates in a fixed bed reactor tube: Endothermic steam methane reforming, Chem. Eng. Sci., 2017, 168, pp. 156-177).

In one aspect, the method next comprises (b) calculating, using (i) a Reformer Model as above or (ii) a combination of a Reformer Model and the outside tube wall temperatures from step (a), the inside wall temperature at the one or more elevations in the bottom half of the furnace, and at the one or more elevations in the upper half of the furnace, for one or more reformer tubes located in the same portion of reformer tubes as in step (a).

In step (c), the method comprises calculating, using (i) a Reformer Model as above or (ii) a Reforming Catalyst Carbon Formation Model, the temperature for carbon formation under then-existing process conditions at the one or more elevations in the bottom half of the furnace, and at the one or more elevations in the upper half of the furnace, for the same one or more reformer tubes in step (b). Reforming Catalyst Carbon Formation Models in this regard include those known in the art including without limitation Catalyst Carbon Formation Models for typical Ni-based reforming catalysts such as disclosed in J.-W. Snoeck and G. F. Froment, Steam/CO2 Reforming of Methane. Carbon Formation and Gasification on Catalysts with Various Potassium Contents, *Ind. Eng. Chem. Res.* 2002, 41, 3548-3556]. Parameters for such models can be derived for the catalyst of interest by collecting relevant experimental data as known in the art.

The method in step (d) comprises calculating Carbon Margin at the one or more elevations in the bottom half of the furnace, and at the one or more elevations in the upper half of the furnace, by subtracting the inside wall temperature calculated for the one or more reformer tubes in step (b), from the carbon formation temperature calculated for the one or more reformer tubes in step (c). A value for Carbon Margin can be obtained for at least one of the plurality of reformer tubes. In one practice, carbon margin for a single reformer tube is obtained. As aforesaid, "Carbon Margin" is the difference between the current maximum process gas temperature (this is equal to reformer tube inside wall temperature) and the temperature at which rate of carbon formation is positive. Carbon Margin as a function of elevation in the tube is defined as the difference between temperature at which net rate of carbon formation is zero for given process conditions (i.e., system pressure and species concentrations) and the corresponding tube inner wall temperature. Typically, Carbon Margin goes through a minimum in the region that is at 4-12' elevation in the tube as shown in FIG. 1. Carbon formation occurs when at any time and at any elevation carbon margin becomes negative (i.e., $\Delta T < 0$ in FIG. 1). For a top-fired reformer, carbon margin is typically lower in the upper half of the furnace compared to the bottom half. In one practice, the elevations of interest for the carbon margin calculating are located in the upper half of the furnace, e.g., typically anywhere within top 12' of the fired length of the reformer. Depending on the catalyst loading and operating conditions the elevations of interest for the Carbon Margin calculation may move along the reformer tube length.

Carbon Margin can be obtained using a physics-based Reformer Model, as above, in combination with a Reforming Catalyst Carbon Formation Model as above. Carbon Margin can also be obtained from prior available data, or from the guidelines for Carbon Margin reduction over time for typical reformer operating conditions (e.g., thumb rule of 15° F. Carbon Margin reduction per year for a typical reformer operation). As aforesaid, in one embodiment, the Carbon Margin is obtained using a physics-based Reformer Model, as above, in combination with a Reforming Catalyst Carbon Formation Model as above; in one practice in this regard, the physics-based Reformer Model and the Reforming Catalyst Carbon Formation Model are for a single reformer tube. In either one or both of the physics-based Reformer Model and/or the Reforming Catalyst Carbon Formation Model, each Model individually comprises information for one or more of the following: different classes of reformer tubes, different spatial distributions of reformer tubes, different geometries of reformer tubes, and different radiant environments for the reformer furnace.

Carbon Margin can be different for various tube types in the reformer due to the difference in their wall temperatures, e.g., gap tubes and non-gap tubes. In one practice, a buffer value is added to the carbon margin, e.g., the buffer value is a percentage of the carbon margin; in one practice, a buffer value of at least 15% of the carbon margin is added to the carbon margin. Any percentage greater than zero percent can be used as a buffer value.

The method in step (e) comprises calculating the maximum allowable operating temperature for the reformer tube section located in the upper half of the furnace by adding the Carbon Margin calculated in step (d) for the one or more elevations in the upper half of the furnace to the outside tube wall temperature at the one or more elevations in the upper half of the furnace obtained in step (a). For example, once the Carbon Margin for the reformer tubes of interest is obtained (with or without any additional buffer value), it is added to the upper half TWTs (plus additional buffer if desired) to get the maximum allowed operating temperature (MAOT) for the portion of reformer tube sections located in the upper half of the furnace. In one instance of this practice, the method comprises calculating, from the tube wall temperatures determined for the portion of reformer tube sections located in the upper half of the furnace and the carbon margin, a maximum allowable operating temperature for the reformer tube sections located in the upper half of the furnace. In another practice, the calculation of the maximum allowable operating temperature for the reformer tube sections located in the upper half of the furnace further comprises one or more of the following: reformer tube design temperature, field measured tube and pigtail growth data, pigtail temperatures, outlet sub-header temperatures. In one embodiment in this regard, either or both of the pigtail temperatures and the outlet sub-header temperatures are directly measured or estimated.

In step (f) the method comprises determining, from the maximum allowable operating temperature calculated in step (e), a temperature balance for the furnace. In one practice, this calculated maximum allowable operating temperature is for the portion of reformer tube sections located in the upper half of the furnace and is used as a constraint while balancing the reformer using tube wall temperatures determined for the portion of reformer tube sections located in the bottom half of the furnace. From the maximum allowable operating temperature thus calculated, a furnace temperature balance for the reformer tube sections in the upper half of the furnace is determined. In step (g) the method then comprises adjusting the burner valve positions to implement the temperature balance of the furnace.

In various practices, adjusting the burner valve positions in step (g) comprises calculating new burner valve positions to (i) minimize the hottest outside wall temperature in reformer tubes located in the bottom half of the furnace, or (ii) minimize the outside wall temperature spread in reformer tubes located in the bottom half of the furnace, or (iii) maintain the outside wall temperature at the one or more elevations in the upper half of the furnace, for the same one or more reformer tubes as in step (b) below the corresponding maximum allowable operating temperature for the reformer tube section located in the upper half of the furnace calculated in step (e). The burner valve positions can be adjusted to one or more of the calculated new burner valve positions.

For example, the determination of the temperature balance for the furnace can comprise minimizing the highest tube wall temperatures determined for the reformer tube sections located in the bottom half of the furnace, or for the reformer tube sections located in the upper half of the furnace, or both. In another exemplary practice, the determination of the temperature balance for the furnace can comprise minimizing the standard deviation for the tube wall temperatures for the reformer tube sections located in the bottom half of the furnace, or for the reformer tube sections located in the upper half of the furnace, or both. In yet another sample practice, the determination of the temperature balance for the furnace can comprise utilizing (i) pre-determined gain values for the tube wall temperatures for one or more reformer tube sections located in the bottom half of the furnace and one or more reformer tube sections located in the upper half of the furnace, and (ii) at least one burner valve position.

The temperature balance, once determined by the techniques herein, is implemented for the furnace by adjusting at least one of the burner valve positions. In one practice, the burner valve positions are adjusted via a closed loop control. In another practice, the control loop system comprises automated burner control valves, each automated burner control valve associated with a respective burner valve or respective group of burner valves.

Example

The following is an example of the method of the disclosure where carbon margin, as a constraint, is a limitation for aggressive running of the reformer and how that can be alleviated by modifying the balancing algorithm. A top-fired reformer has a typical TWT profile along the tube length as shown in FIG. 2 (black triangles).

Figure 2:
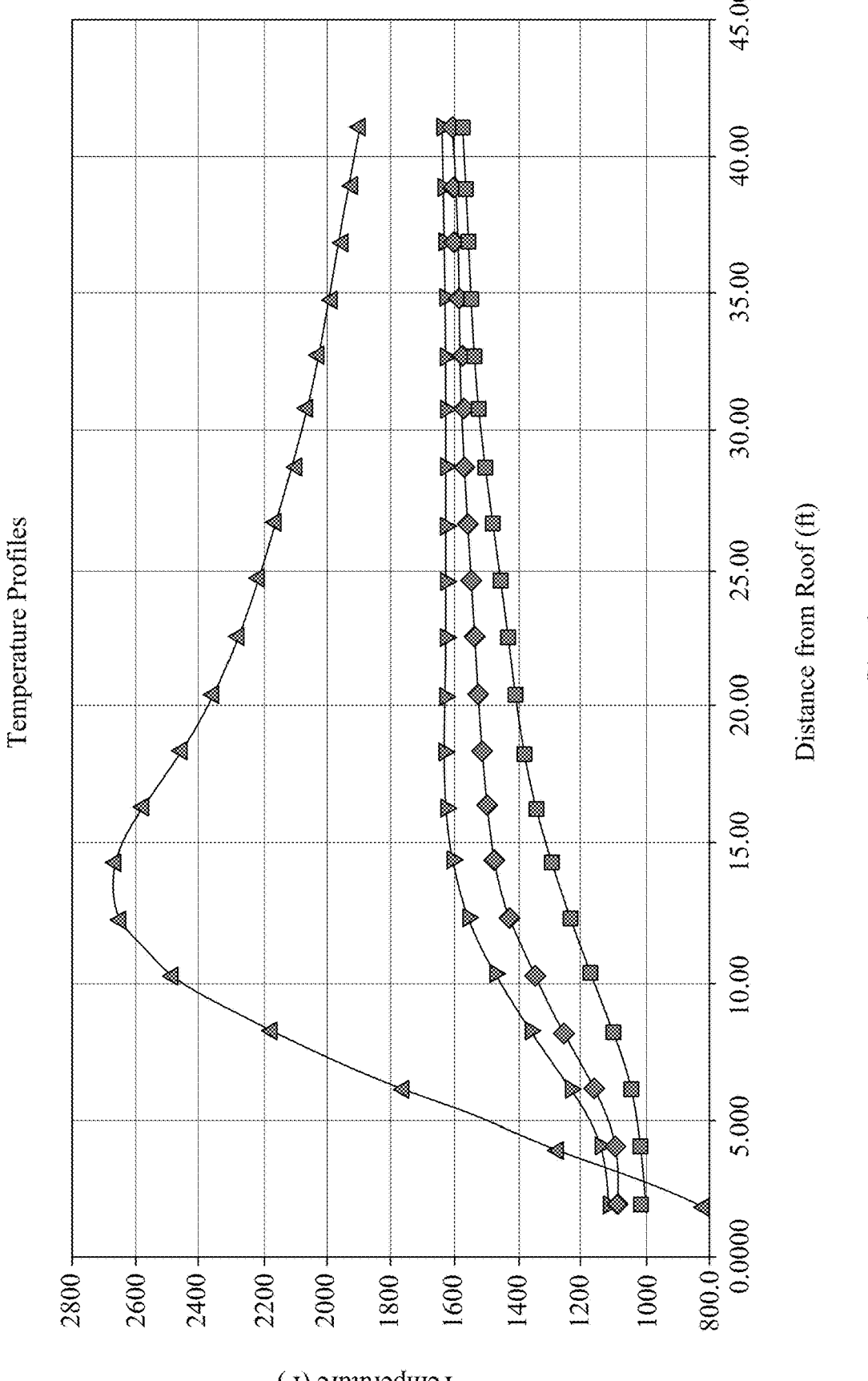
FIG. 2 is a graph of representative reformer tube wall temperature profile along tube length.
Figure 3:
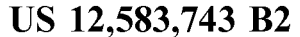
FIG. 3 is a graph of representative outer versus inner row reformer tube wall temperature profiles for selected tubes.

Individual reformer tubes, depending on their location in the reformer, show a different temperature profile than the one seen in FIG. 2. Outer row tubes may show a temperature inversion, that is tube wall temperatures in the upper half of the furnace are higher than tube wall temperatures in the bottom half for these same tubes. A representative example of this is shown in FIG. 3.

Figure 4:
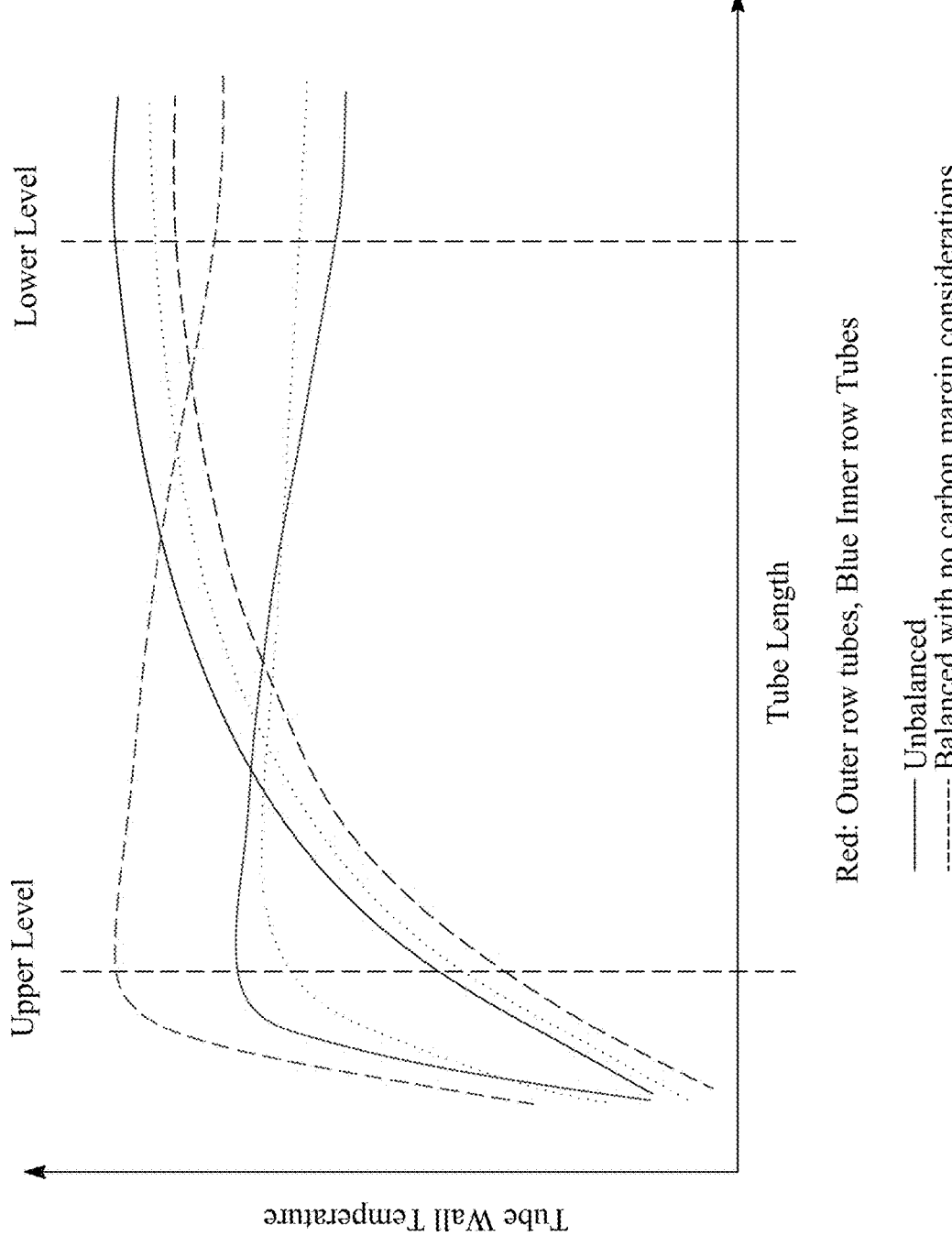
FIG. 4 is a graph of unbalanced (solid lines) versus balanced (dotted lines) of representative reformer tube wall temperatures the upper half and bottom half of a reformer furnace.

In such a case, when the reformer is balanced based on just lower half tube wall temperatures, the tube wall temperatures of outer rows in the upper half can increase as shown in FIG. 4. This can result in reduction of the carbon margin.

To overcome the issue of tube wall temperatures increasing in upper half such that the Carbon Margin becomes negative for certain tubes, a Carbon Margin based on the tube wall temperatures for the upper half as a constraint is added to the balancing algorithm. This new objective function, as constrained, is written as shown in Eq. 2a and Eq. 2b:

$$\text{minimize}[\max(\text{TWTlower}_{i_{initial}} + \Sigma_{j=1}{}^m \quad \text{gain}_{ij} \times \Delta \\ \text{valve}_j)_{i=1}{}^n]$$

$$\text{subject to, } \max(\text{TWTupper}_{i_{initial}} + \Sigma_{j=1}{}^m \text{ upper gain}_{ij} \times \\ \Delta\text{valve}_j)_{i=1}{}^n \leq \text{MAOT}_{UH} \qquad \text{Eq. 2a}$$

$$\text{minimize}[\text{stdev}(\text{TWTlower}_{i_{initial}} + \Sigma_{j=1}{}^m \quad \text{gain}_{ij} \times \Delta \\ \text{valve}_j)_{i=1}{}^n]$$

$$\text{subject to, } \max(\text{TWTupper}_{i_{initial}} + \Sigma_{j=1}{}^m \text{ uppergain}_{ij} \times \\ \Delta\text{valve}_j)_{i=1}{}^n \leq \text{MAOT}_{UH} \qquad \text{Eq. 2b}$$

Wherein $\text{TWTlower}_i$ is lower half tube wall temperature of the $i^{th}$ tube in the reformer, $\text{gain}_{ij}$ is the change in lower half tube wall temperature of the $i^{th}$ tube per unit change in the fuel valve positions of the $j^{th}$ burner group, $\Delta\text{valve}_j$ is the amount of adjustment made in the fuel valve positions of the $j^{th}$ burner group, $\text{TWTupper}_i$ is upper half tube wall temperature of the $i^{th}$ tube in the reformer, $\text{uppergain}_{ij}$ is the change in upper half tube wall temperature of the $i^{th}$ tube per unit change in the fuel valve positions of the $j^{th}$ burner group, and $\text{MAOT}_{UH}$ is the maximum allowable operating temperature for upper portions of the reformer tubes calculated based on current carbon margin.

Results of such a temperature balancing effort compared to conventional balancing are shown in Table 1.

In the original (unconstrained) algorithm (Eq. 1a, Eq. 1b), lower TWT were balanced significantly as seen from the spread ($4\sigma$) reduction from 85.6° F. to 45.6° F. At the same time upper half maximum TWT increased from 1666.3° F. to 1678.0° F.

At this time, the reformer upper half TWT constraint ($\text{MAOT}_{UH}$) was 1665° F. based on the carbon margin. The risk of carbon formation hence increased upon conventional balancing of the reformer. The balancing algorithm was hence modified to run with upper half TWT constraint of 1665° F. and the resulting burner valve positions solution was implemented. The lower half TWT spread improved from 88.4° F. to 77.2° F. as the upper half maximum TWT decreased from 1665.4° F. to 1660.8° F., alleviating the possibility of carbon formation.

At the same time about 18° F. reduction in lower half maximum TWT was also observed (from 1731.7° F. to 1712.9° F.), which enables efficiency improvement measures such as ROT increase while staying below carbon formation threshold at the upper half. Efficiency improvement by ROT increase is achieved due to higher $CH_4$ conversion in the reformer at higher outlet temperature.

TABLE 1

| Reformer balancing with and without UH constraints | | | | |
|---|---|---|---|
| | Temperature (° F.) | | | |
| | Algorithm with no UH constraint | | Algorithm with UH MAOT constraint | |
| | Unbalanced | Balanced | Unbalanced | Balanced |
| Max. TWT at lower half | 1731.5 | 1705.7 | 1731.7 | 1712.9 |
| Max. TWT at upper half | 1666.3 | 1678.0 | 1665.4 | 1660.8 |
| Spread (4σ) at lower half | 85.6 | 45.6 | 88.4 | 77.2 |

While the disclosure has been shown and described with reference to certain embodiments, it will be understood by those skilled in the art that various changes in form and details may be made therein without departing from the spirit and scope of the present invention and equivalents thereof.

What is claimed is:

1. A method of operating a top-fired steam reformer furnace, the furnace comprising (i) an upper half and a bottom half, (ii) a plurality of burners, (iii) a plurality of reformer tubes disposed vertically within the furnace, each reformer tube having a section located in the upper half of the furnace and a section located in the bottom half of the furnace, (iv) the plurality of burners, each burner having a burner valve with an adjustable position for controlling the fuel flow and associated heat release to the furnace in the vicinity of that burner, the method comprising:

(a) obtaining, for at least a portion of the reformer tubes, the outside tube wall temperature at one or more elevations in the bottom half of the furnace, and, for that same portion of reformer tubes, obtaining the outside tube wall temperature at one or more elevations in the upper half of the furnace;

(b) calculating, using (i) a Reformer Model or (ii) a combination of a Reformer Model and the outside tube wall temperatures obtained in step (a), the inside wall temperature at the one or more elevations in the bottom half of the furnace, and at the one or more elevations in the upper half of the furnace, for one or more reformer tubes located in the same portion of reformer tubes as in step (a);

(c) calculating, using (i) a Reformer Model or (ii) a Reforming Catalyst Carbon Formation Model, the temperature for carbon formation under then-existing process conditions at the one or more elevations in the bottom half of the furnace, and at the one or more elevations in the upper half of the furnace, for the same one or more reformer tubes in step (b);

(d) calculating Carbon Margin at the one or more elevations in the bottom half of the furnace, and at the one or more elevations in the upper half of the furnace, by subtracting the inside wall temperature calculated for the one or more reformer tubes in step (b), from the carbon formation temperature calculated for the one or more reformer tubes in step (c);

(e) calculating the maximum allowable operating temperature for the reformer tube section located in the upper half of the furnace by adding the Carbon Margin calculated in step (d) for the one or more elevations in the upper half of the furnace to the outside tube wall temperature at the one or more elevations in the upper half of the furnace obtained in step (a);

(f) determining, from the maximum allowable operating temperature calculated in step (e), a temperature balance for the furnace; and (g) adjusting the burner valve positions to implement the temperature balance of the furnace.

2. The method of claim 1 wherein the portion of reformer tubes comprises at least 25% of the reformer tubes.

3. The method of claim 1 wherein the portion of reformer tubes comprises at least 50% of the reformer tubes.

4. The method of claim 1 wherein the portion of reformer tubes includes reformer tubes not adjacent to each other.

5. The method of claim 1 wherein the portion of reformer tubes are spatially distributed throughout the furnace.

6. The method of claim 1 wherein the Reformer Model and the Reforming Catalyst Carbon Formation Model are for a single reformer tube.

7. The method of claim 1 wherein either one or both the Reformer Model and Reforming Catalyst Carbon Formation Model each individually comprise information for one or more of the following: different classes of reformer tubes, different spatial distributions of reformer tubes, different geometries of reformer tubes, and different radiant environments for the reformer furnace.

8. The method of claim 1 wherein in step (a) the outside tube wall temperatures for reformer tube sections located in the bottom half of the furnace are determined using direct measurement, or are estimated, or are determined using a combination of both.

9. The method of claim 8 wherein the direct measurement is made by pyrometer, infrared camera, or both.

10. The method of claim 1 wherein in step (a) the outside tube wall temperatures for reformer tube sections located in the upper half of the furnace are determined using direct measurement, or are estimated, or are determined using a combination of both.

11. The method of claim 10 wherein the direct measurement is made by pyrometer, infrared camera, or both.

12. The method of claim 1 wherein determining the temperature balance in step (f) comprises minimizing the highest outer tube wall temperature for the reformer tube section located in the bottom half of the furnace or minimizing the highest outer tube wall temperature for the reformer tube section located in the upper half of the furnace, or both.

13. The method of claim 1 wherein determining the temperature balance in step (f) comprises minimizing the standard deviation for the outer tube wall temperatures for the reformer tube sections located in the bottom half of the furnace or minimizing the standard deviation for the outer tube wall temperatures for the reformer tube sections located in the upper half of the furnace, or both.

14. The method of claim 1 wherein determining the temperature balance in step (f) comprises utilizing (i) predetermined gain values for the outer tube wall temperatures for one or more reformer tube portions located in the bottom half of the furnace and in the upper half of the furnace and at least one burner valve position.

15. The method of claim 1 wherein adjusting the burner valve positions in step (g) comprises calculating new burner valve positions to (i) minimize the hottest outside wall temperature in reformer tubes located in the bottom half of the furnace, or (ii) minimize the outside wall temperature spread in reformer tubes located in the bottom half of the furnace, or (iii) maintain the outside wall temperature at the one or more elevations in the upper half of the furnace, for the same one or more reformer tubes as in step (b) below the corresponding maximum allowable operating temperature for the reformer tube section located in the upper half of the furnace calculated in step (e).

16. The method of claim 15 wherein the burner valve positions are adjusted to one or more of the calculated new burner valve positions.

17. The method of claim 1 wherein the burner valve positions are adjusted in step (g) via a closed loop control.

18. The method of claim 17 wherein the control loop system comprises automated burner control valves, each automated burner control valve associated with a respective burner valve or respective group of burner valves.

19. The method of claim 1 wherein the calculation of the maximum allowable operating temperature in step (e) for the reformer tube sections located in the upper half of the furnace further comprises one or more of the following: reformer tube design temperature, field measured tube and pigtail growth data, pigtail temperatures, outlet sub-header temperatures.

20. The method of claim 19 wherein either or both of the pigtail temperatures and the outlet sub-header temperatures are directly measured or estimated.

\*    \*    \*    \*    \*